Oct. 1, 1929.  G. H. GIBSON  1,730,133
STEAM PURIFIER
Filed Nov. 15, 1926   2 Sheets-Sheet 1

INVENTOR
GEORGE H. GIBSON
BY
John E. Hubbell
ATTORNEY

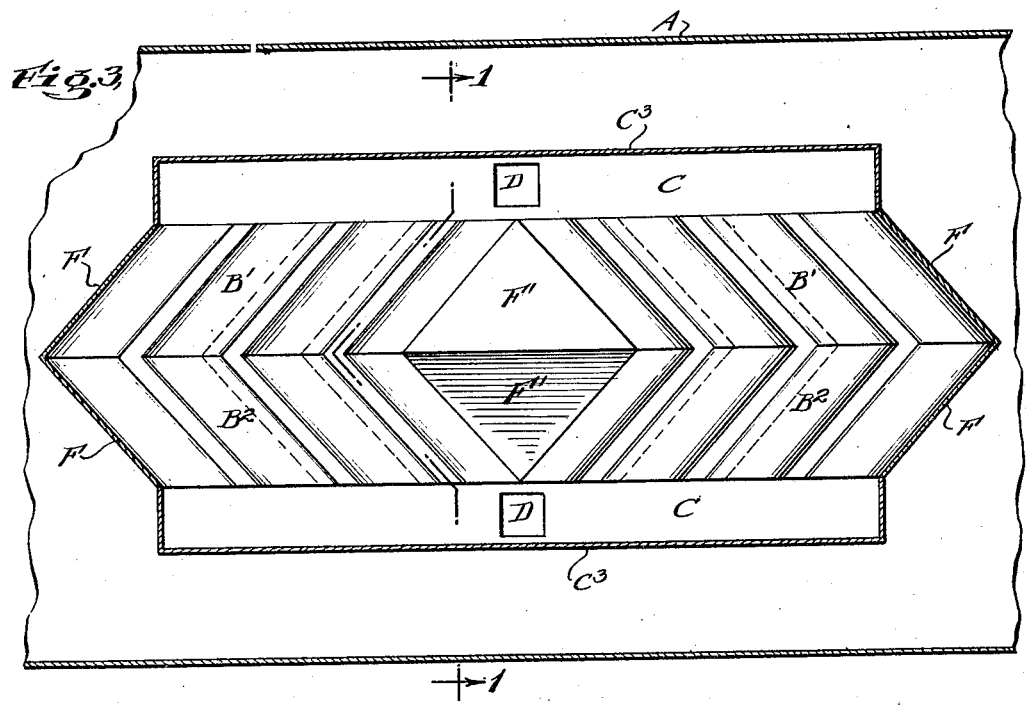
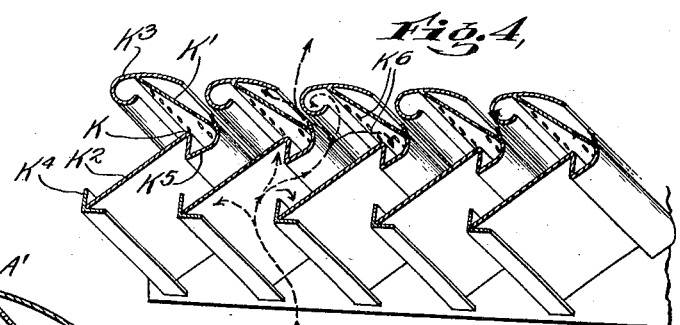
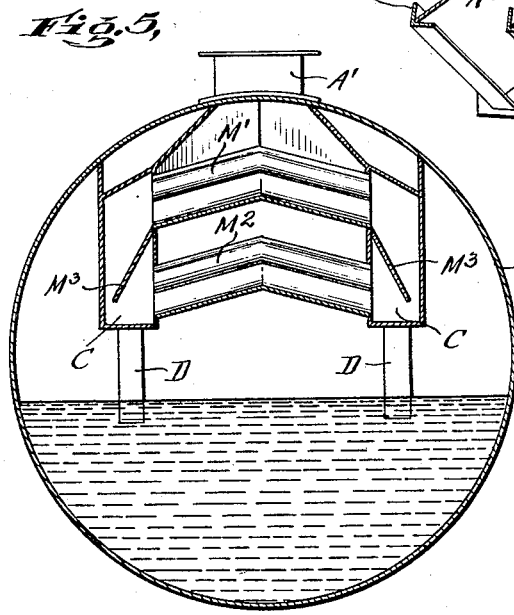
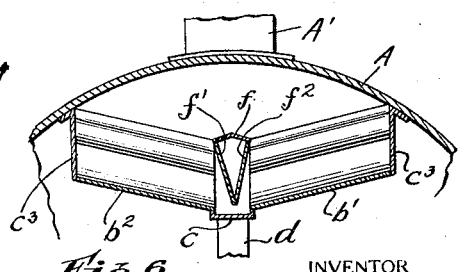

Patented Oct. 1, 1929

1,730,133

UNITED STATES PATENT OFFICE

GEORGE H. GIBSON, OF UPPER MONTCLAIR, NEW JERSEY

STEAM PURIFIER

Application filed November 15, 1926. Serial No. 148,339.

The general object of the present invention is to provide improved means for separating impurities, particularly liquids, from gases. More specifically, the object of the present invention is to provide an improved separator or purifier within a steam and water drum for separating moisture or oil vapor from the steam passing out of the drum.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 3 is a plan view of the baffle system;

Fig. 4 is a view of a modified baffle arrangement;

Fig. 5 shows a modified form of separator; and

Fig. 6 is a view similar to Fig. 1 of another modification of my invention.

Figure 1:
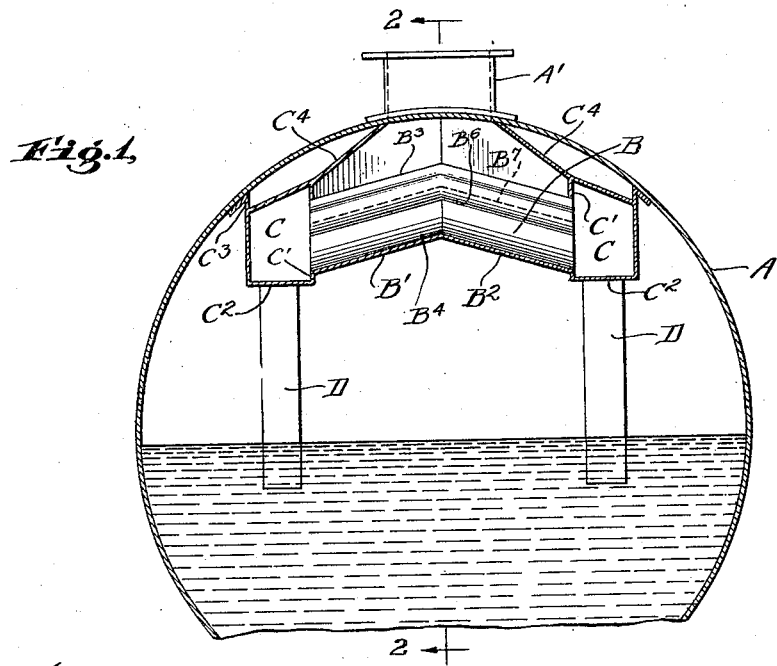
Fig. 1 is an elevation in section on the line 1—1 of Fig. 3.

In the drawings is shown a steam purifier or separator located in the upper portion and extending longitudinally of the steam space of a steam and water drum and consisting of a plurality of oppositely inclined baffles having their lower ends draining into one or more longitudinal gutters. The purifier is so located in the drum that a dry steam space is formed between the upper part of the baffle system and the top of the steam drum.

In the preferred mode of construction of my invention, I provide a steam and water drum A having the usual cylindrical form and central steam outlet A' to the steam main, with a series of baffles B sloping upwardly toward the center line of the drum and draining into gutters C extending along the lower baffle ends. The separated moisture may be returned to the lower part of the drum A by pipes D.

Figure 2:
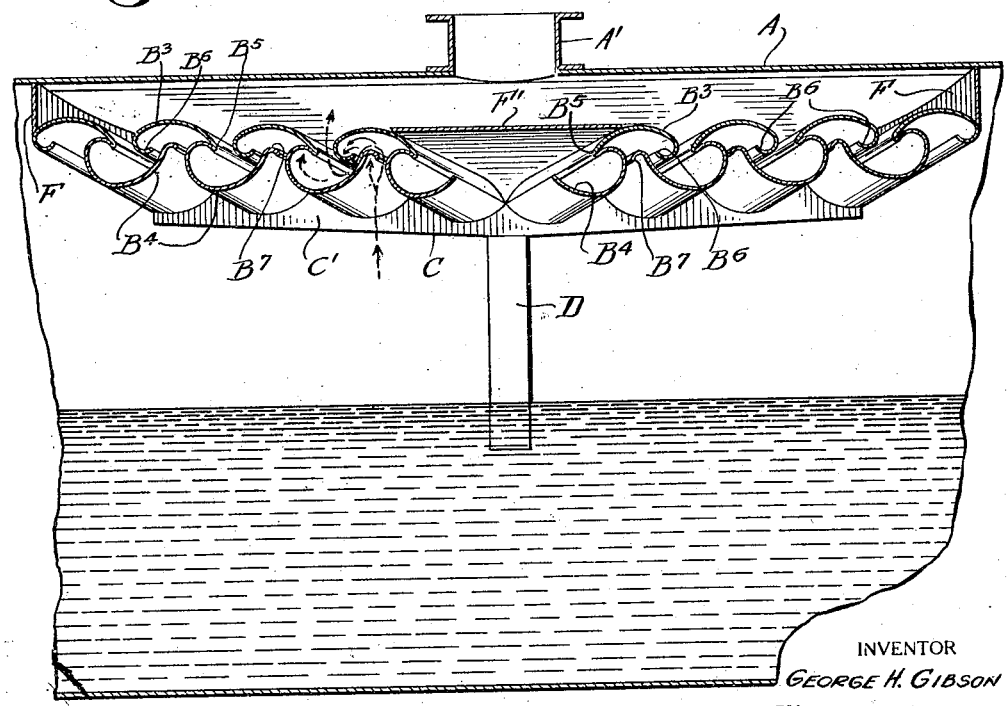
Fig. 2 is a longitudinal section on the line 2—2 of Fig. 1.

The baffle system B is composed of two longitudinal series B', B$^2$ of transversely extending baffles on each side of the transverse center line of the drum. Each transverse baffle is inclined towards the highest part of the drum and extends at an angle to the transverse center line of the drum as shown in Fig. 3. The individual baffles B' are joined at their highest points to corresponding baffles B$^2$ by any suitable method. The baffle system may extend the entire length of the drum, but it is sufficient for usual operating conditions to restrict it to a fraction of the length as shown in Fig. 2. The lower ends of the baffles B' and B$^2$ are connected to gutters C which are longitudinally inclined to the same degree as the baffles.

In the preferred construction a baffle of the form shown in Figs. 1 and 2 is preferably used. This baffle is in the general form of an inclined letter S. Each baffle consists of an upper downwardly curved portion B$^3$ and a lower upwardly curved portion B$^4$, having their adjacent edge portions meeting in a downwardly projecting edge B$^5$. The outer edge of the portion B$^3$ is turned inwardly and upwardly at B$^6$, while the outer edge of the portion B$^4$ is outwardly and downwardly turned at B$^7$. When in the proper position in the baffle system, the upper curved portion B$^3$ of each baffle overlaps the lower curved portion B$^4$ of one of the adjacent baffles.

The gutters C are of U-shaped cross section, each consisting of an inner side wall C' to which the individual baffles are connected, a bottom C$^2$ and a vertical outer wall C$^3$ having a flanged edge secured to the drum A. The bottom C$^2$ slopes downwardly from each end to the center portion of the gutter to which the pipe D is connected. The inner wall C' of each gutter is provided with suitable openings to allow the water and impurities from the baffles to drop to the bottom of the gutter. The inner wall is extended upwardly until it makes an air tight connection with an inclined plate C$^4$ extending longitudinally of the drum A and connected at its lower edge to the outer wall C³ and at its upper edge to the steam drum. This arrangement prevents steam passing into the gutter chamber from the lower part of the baffle system from passing directly to the dry steam space above the baffles, as such steam generally contains some moisture and moreover would have a tendency to entrap water passing into the gutters from the upper part of the baffles and carry it into the dry steam space. Due to the plates C⁴ the steam is forced to pass through the upper part of the baffle system before entering the dry steam space above the baffles.

At each end of the baffle system are vertical plates F connected to the outermost baffles, the plates C' and C⁴, and to the upper part of the drum A to prevent steam carrying moisture from entering over the baffle system. Triangular plates F' connected to the tops of the adjacent center baffles are used to prevent steam passing directly from the lower part of the drum to the dry steam outlet A'.

The wet steam passes upwardly into the baffle system, where it contacts with the numerous projecting baffle portions, on which the moisture and other impurities condense and either drop back into the water directly or flow down the baffle gutters into the gutters C and through the pipes D at the sides of the drum to the water.

In the general operation of the steam purifier shown, steam containing drops of moisture due to priming and bubbles due to foaming, passes upwardly from the water space in the drum A towards the separator baffles. Due to the arrangement of the baffles at the highest level possible, the unobstructed drum volume is large enough so that some of the bubbles break before reaching the baffles and part of the moisture content may be separated by gravity. The wet steam passes through the baffle system and the remaining moisture and impurities are separated out by contact with the baffles. The dry steam resulting passes out through the outlet A' to the steam main.

In Fig. 4 of the drawings is shown a modified form of baffle for use in a steam separator. Each baffle K consists of oppositely inclined upper and lower plates K' and K². The plate K' is provided with an integral plate element K³ secured at the upper edge thereof and curved downwardly and inwardly to form a gutter. The plate K² has a V-shaped plate K⁴ secured to the opposite edge. The plate K² is formed at its upper edge portion with a trough shaped plate section K⁵ secured at an angle to the lower edge of the plate K'. The plate K' is provided with spaced rows of drain holes K⁶ for allowing drops of water to pass downwardly to the gutters formed by the plate elements K³, K⁴ and K⁵ with the plates K' and K². The steam flow through the baffle is diagrammatically illustrated.

In Fig. 5 is shown a modified arrangement of baffles wherein the system is formed by superposed rows of baffles M', M². A slightly greater height of gutter is necessary with superposed rows and a downwardly extending baffle plate M³ from the inner wall of the gutter to prevent wet steam from going directly from the lower baffle through the gutter to the highest part of the upper baffle, otherwise the arrangement is the same. This arrangement may be used where a larger baffle surface is desirable.

In Fig. 6 a second modification of my invention is shown wherein the purifier is formed by oppositely inclined baffles b' and b² having their lower ends connected to a gutter c extending along the longitudinal center line of the drum. Longitudinally extending plates c³ close the upper ends of the baffles and are secured at their upper portions to the steam drum. Extending along the top of the gutter c is a plate f and depending at an angle therefrom are baffle plates f' and f² for the purpose of deflecting any wet steam in the gutter portion into the baffle system.

Among the desirable features of my invention are its compactness and applicability to existing drum installations. It is especially advantageous in being located at a high level in the drum and in utilizing the upper part of the drum shell as the top side of the dry steam space. The unobstructed drum volume below the separator is very desirable as it permits fluctuations in the water level without affecting the separator operation and provides sufficient time for the air bubbles to break, for entrained water to be separated by gravity before entering the baffle system and to reduce local steam velocities in the drum. The specific forms of self-draining baffles disclosed are designed to give a high ratio of baffle area to the drum volume occupied and to lower the steam velocity through the baffles.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a steam drum, a steam separator comprising a plurality of oppositely inclined baffles connected in pairs at their upper ends, gutters connected to the lower ends of said baffles, plates cutting off the top of said gutters from the space above said baffles, and end plates closing the openings between the tops of the end baffles and steam drum.

2. The combination with a steam drum having a steam outlet at the top thereof, of a steam separator in the upper part of said drum below said steam outlet and comprising a plurality of longitudinally spaced baffle plates extending transversely of said drum, and means connecting the baffle plates at each end of said separator with said drum at points adjacent the ends of the separator to provide a large dry steam space between said baffle plates and said drum and connected to said steam outlet, said separator being arranged in said drum to leave a large unobstructed drum space between the separator and normal water level in said drum.

3. The combination with a steam drum having a steam outlet at the top thereof, of a steam separator in the upper part of said drum symmetrically arranged with respect to said steam outlet and comprising a plurality of V-shaped baffle plates extending transversely of said drum, a gutter connected to the lower end of each of said baffle plates, and means connecting the baffle plates at each end of said separator with said drum at points adjacent the ends of the separator to provide a large unobstructed dry steam space between said baffle plates and said drum.

4. The combination with a steam drum having a steam outlet at the top thereof, of a steam separator in the upper part of said drum symmetrically arranged with respect to said steam outlet and comprising a plurality of inclined baffle plates on both sides of said outlet and extending transversely of said drum, a gutter connected to the lower end of each of said baffle plates, means connecting the baffle plates at each end of said separator with said drum at points adjacent the ends of the separator to provide a large dry steam space between said baffle plates and said drum and means for preventing wet steam from passing from said gutter directly into said dry steam space.

5. A steam separator comprising a plurality of inclined side by side transverse baffles, each of said baffles having a curved upper section and a curved lower section connected thereto, the upper section of each baffle overlapping the curved lower section of one of the adjacent baffles.

6. A steam separator comprising a plurality of obliquely inclined side by side transverse baffles, said baffles having upper and lower plate sections, each of said sections having concavely curved portions for draining said baffles, and the upper section of each of said baffles arranged to overlap the lower section of one of the adjacent baffles.

7. In a steam and water drum having a steam outlet, a steam separator comprising a plurality of rows of obliquely inclined side by side transverse baffles, the baffles in each of said rows being arranged in overlapping relation, baffles having concavely curved portions for draining said baffles, and plates connecting said baffles to said drum, whereby wet steam passing to said steam outlet passes first through said baffle system.

8. The combination with a steam and water drum having a steam outlet at the top thereof, of a steam separator mounted in said drum below said steam outlet and having a bottom wall comprising a plurality of rows of inclined transverse baffles in overlapping relation and substantially vertical side and end walls connecting said bottom wall to said drum, whereby a dry steam space is formed by said walls and drum and connected to said steam outlet.

Signed at New York city, in the county of New York and State of New York, this ninth day of November, A. D. 1926.

GEORGE H. GIBSON.